United States Patent [19]

Kamada et al.

[11] Patent Number: 4,957,949

[45] Date of Patent: Sep. 18, 1990

[54] THERMOCHROMIC COLOR MASTERBATCH

[75] Inventors: Masayasu Kamada, Kusatsu; Toshihisa Maeda, Uji; Tadashi Kobayashi, Kyoto; Goro Shimizu, Ootsu, all of Japan

[73] Assignee: Matsui Shikiso Chemical Co., Ltd., Kyoto, Japan

[21] Appl. No.: 263,755

[22] Filed: Oct. 28, 1988

[30] Foreign Application Priority Data

Oct. 29, 1987 [JP] Japan ................................ 62-274785
Jul. 25, 1988 [JP] Japan ................................ 63-186137

[51] Int. Cl.$^5$ .......................... C08K 9/04; C08L 91/06
[52] U.S. Cl. .................................... 523/201; 523/205; 523/206; 523/207; 523/351; 524/277; 524/487; 524/488
[58] Field of Search ............... 523/351, 201, 206, 205, 523/207; 428/407; 524/487, 488, 277

[56] References Cited

U.S. PATENT DOCUMENTS

| | | | |
|---|---|---|---|
| 3,560,229 | 2/1971 | Farnham et al. | 106/22 |
| 4,173,492 | 11/1979 | Pollard | 106/452 |
| 4,271,211 | 6/1981 | Knepper | 428/407 |
| 4,826,550 | 5/1989 | Shimizu et al. | 264/137 |

OTHER PUBLICATIONS

Abstract, Japanese Patent No. 58-32671, Keino, 5/83.

*Primary Examiner*—Allan M. Lieberman
*Attorney, Agent, or Firm*—Armstrong, Nikaido, Marmelstein, Kubovcik & Murray

[57] ABSTRACT

Disclosed is a thermochromic color masterbatch for use in a thermoplastic resin comprising a wax having substantially homogeneously dispersed therein a thermochromic granular material which is coated with a hydrophilic high-molecular weight substance, said thermochromic granular material being a mixture of a thermochromic composition comprising an electron-donating chromogen, an electron acceptor and a solvent with a thermosetting resin.

13 Claims, No Drawings

THERMOCHROMIC COLOR MASTERBATCH

This invention relates to a thermochromic color masterbatch for use in thermoplastic resins.

Thermoplastic resins have so far been used in various fields because they can be molded with ease. From the color effect viewpoint, however, thermoplastic resin moldings are of less commercial value since the dyes and pigments used for coloring them are flat or monotonous in color.

Meanwhile, thermochromic compositions are known which comprise an electron-donating chromogen, an electron acceptor and a solvent (U.S. Pat. No. 3,560,229). It is also known that shaped resin articles having higher commercial value from the color effect viewpoint, which are capable of changing color with a change in temperature, can be obtained by admixing such thermochromic compositions with the resins (Unexamined Japanese Patent Publication No. 75460/1975).

However, direct admixing of such a thermochromic composition as mentioned above with thermoplastic resins and shaping of the mixture result in escape of one or more components of the thermochromic composition or marked impairment of the thermochromic behavior of said composition due to exposure to high temperatures in the step of mixing and to severe heat and pressure conditions in the step of molding. Even if resin moldings with a thermochromic composition dispersed therein could be obtained by elaborating processing conditions, the three components of the thermochromic composition will undergo the phenomenon of blooming with the lapse of time and thus migrate onto the surface of the moldings. It is very difficult to hold these three components stably in resins. When a thermochromic composition is used in the microencapsulated form and kneaded with a molten resin, the capsules will be broken under severe conditions in the molding step and, as a result, the desired thermochromism will not be attained.

It is further known to prepare a coated thermochromic granular material by granulating a mixture of a thermochromic composition and a thermosetting resin and surface-coating the resulting granules with a hydrophilic high-molecular weight substance (Unexamined Japanese Patent Publication No. 32671/1983). This coated thermochromic granular material also undergoes degradation of the surface coat layer by direct kneading with molten thermoplastic resins and by exposure to severe heat and pressure conditions in the molding step. As a result, the thermochromic performance becomes unsatisfactory and the blooming phenomenon is unavoidable.

Accordingly, it is an object of the invention to provide a thermochromic color masterbatch capable of exhibiting a high thermochromic property when molded together with a thermoplastic resin, and free of blooming to the surface of molding with a lapse of time.

Another object of the invention is to provide thermoplastic resin moldings (shaped articles) with high commercial value from the color effect viewpoint.

These and other objects of the invention will be apparent from the following description.

The invention provides a thermochromic color masterbatch comprising a wax having substantially homogeneously dispersed therein a thermochromic granular material which is coated with a hydrophilic high-molecular weight substance, said thermochromic granular material being a mixture of a thermochromic composition comprising an electron-donating chromogen, an electron acceptor and a solvent with a thermosetting resin.

Our research revealed that when a masterbatch having the above coated thermocromic granular material homogeneously dispersed in a wax, is molded in mixture with thermoplastic resins, the escape of the essential components of the thermochromic composition from the system can be prevented even under the severe high-temperature, high-pressure conditions of resin molding, while the thermochromic property of said composition can be satisfactorily exhibited without encountering the phenomenon of blooming of the components of said thermochromic composition with time. Such surprising effects can be produced only when the above-mentioned coated thermochromic granular material is dispersed in a wax.

The coated thermochromic granular material to be used in the practice of the invention is prepared by mixing a thermosetting resin with a thermochromic composition containing an electron-donating chromogen, an electron acceptor and a solvent, granulating the resulting mixture, and surface-coating the resulting granules with a hydrophilic high-molecular weight substance. Among the various thermochromic granular materials heretofore proposed, only the above coated material can achieve the object of the invention. We proposed such coated thermochromic granular material (Unexamined Japanese Patent Publication No. 32671/1983).

The electron-donating chromogen used as a one component of the thermochromic composition may be any known electron-donating chromogenic substance and includes, for example, substituted phenylmethanes and fluorans, such as 3,3'-dimethoxyfluoran, 3-chloro-6-phenylaminofluoran, 3-diethylamino-6-methyl-7-chlorofluoran, 3-diethyl-7,8-benzofluoran, 3,3',3"-tris(p-dimethylaminophenyl)phthalide, 3,3'-bis(p-dimethylaminophenyl)-7-phenylaminofluoran and 3-diethylamino-6-methyl-7-phenylaminofluoran, as well as various indolylphthalides, spiropyrans and coumarins. These may be used either singly or in combination. The proportion of the electron-donating chromogen in the thermochromic composition may vary over a wide range, but is preferably in the range of about 2–20% by weight, more preferably about 4–14% by weight.

The electron acceptor used as another component of the thermochromic composition may be any known electron accepting substance and includes, for example, phenols, azoles, organic acids and, esters and salts of the organic acids.

Examples of phenols are phenylphenol, bisphenol A, cresol, resorcinol, chlorolucinol, oligomer or phenol, β-naphthol, 1,5-dihydroxynaphthalene, pyrocatechol, pyrogallol, trimer of p-chlorophenol-formaldehyde condensate and the like. Examples of azoles are benzotriaoles such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc., imidazoles such as oxybenzimidazole, etc., tetrazoles and the like. The organic acids include aromatic carboxylic acids, aliphatic carboxylic acids and substituted derivatives thereof, etc. Examples of aromatic carboxylic acids are salicylic acid, methylenebissalicylic acid, resorcylic acid, gallic acid, benzoic acid, p-oxybenzoic acid, pyromellitic acid, β-naphthoic acid, tannic acid, toluic acid, trimellitic acid, phthalic acid, terephthalic acid, anthranilic acid, etc. Examples of aliphatic carboxylic acids are aliphatic carboxylic acids containing about 1-20 carbon atoms, preferably about 3-15 carbon atoms such as stearic acid, 1,2-hydroxystearic acid, tartaric acid, citric acid, oxalic acid, lauric acid, etc. Examples of esters are alkyl esters of aromatic carboxylic acids in which the alkyl moiety has 1 to 6 carbon atoms, such as butyl gallate, ethyl p-hydroxybenzoate, methyl salicylate, etc. Examples of salts include ammonium salt and metal salts of the above organic acids. The metal salts include, for example, lithium, sodium, calcium, magnesium, aluminum, zinc, tin, titanium, nickel or the like metal salts. Preferred examples of electron acceptors are 1,2-hydroxystearic acid, tartaric acid, citric acid, etc. These electron acceptor may be used either singly or in combination.

The proportion of the electron acceptor in the thermochromic composition may vary over a wide range, but is preferably in the range of about 4-40% by weight, more preferably about 10-30% by weight.

While the solvent to be present conjointly with the electron-donating chromogen and the electron acceptor may be any one so far in use for thermochromic compositions, it preferably has a boiling point of 150° C. or higher, more preferably about 170°-280° C. Examples of such solvent are saturated or unsaturated alcohols containing about 6-30 carbon atoms, preferably about 8-25 carbon atoms such as octyl alcohol, dodecyl alcohol, lauryl alcohol, cetyl alcohol, myristyl alcohol, stearyl alcohol, behenyl alcohol, geraniol, etc., esters of said alcohols, such as lauryl laurate, lauryl stearate, stearyl laurate, methyl myristate, decyl myristate, lauryl myristate, butylstearate, lauryl palmitate, decyl palmitate, palmitic acid glyceride, etc., azomethines such as benzylideneaniline, benzylidenelaurylamide, O-methoxybenzylidene laurylamine, benzylidene p-toluidine, p-cumylbenzylidene, etc., amides such as acetamide, stearamide, etc., and the like. Examples of preferred solvents are said alcohols, said esters, said azomethines. These may be used either alone or in combination.

The coated thermochromic granular material to be used in the present invention can be prepared by admixing a thermochromic composition comprising the above-mentioned three components with a thermosetting resin by a conventional method, such as interfacial polymerization, in-situ polymerization and the like, granulating the resulting mixture and mixing the resulting granules with a hydrophilic high-molecular weight substance to thereby effect surface coating of said granules with said hydrophilic high-molecular weight substance. The thermosetting resin may be any known one and may include, for example, polyester resins, polyurethane resins, melamine resins, epoxy resins, diallyl phthalate resins, vinylester resins and the like. Preferred examples of thermosetting resins are polyurethane resins, melamine resins, epoxy resins and the like. The proportion of the thermosetting resin in the thermochromic granular material may vary over a wide range but is preferably in the range of about 10-40 parts by weight, more preferably about 15-25 parts by weight, per 100 parts by weight of the thermochromic composition.

The hydrophilic high-molecular weight substance is not limited to any particular species provided that it can be coagulated by means of an acid, an alkaline electrolyte, a heavy metal, an aldehyde or a zwitterion substance. Examples of hydrophilic macromolecular compounds are natural macromolecular compounds such as alginic acid and salts thereof, carrageenan, pectin, gelatin and the like, semisynthetic macromolecular compounds such as methylcellulose, cationized starch, carboxymethylcellulose, carboxymethylated starch, carboxymethylated gum guaiac and the like, and vinyl polymers such as polyvinyl alcohol, polyvinylpyrrolidone, polyacrylic acid, polyacrylamide, maleic acid copolymers and the like. The proportion of the hydrophilic high-molecular weight substance may vary over a wide range but is preferably in the range of about 5-30 parts by weight, more preferably about 10-20 parts by weight, per 100 parts by weight of the thermochromic composition.

The grain size of the thermochromic granular material is not critical but preferably in the range of about 1-50 μm, preferably about 3-15 μm.

The color masterbatch according to the invention can be produced by homogeneously dispersing the coated thermochromic granular material in a wax which is in the molten state, and then pelletizing the mixture obtained.

Generally, the wax have a softening point of about 50°-180° C., preferably about 70°-150° C. and a melt viscosity of about 100-50,000 cps (centipoises), preferably about 500-20,000 cps, and be well compatible with thermoplastic resins. Examples of such wax are paraffin wax, microcrystalline wax, montan wax, carnauba wax, polystyrene wax, polyethylene wax, polypropylene wax, beeswax, anhydrous lanolin and the like. Preferred wax can be suitably determined according to the kind of thermoplastic resins to be kneaded and molded therewith in view of the compatibility therebetween. For example a wax such as paraffin wax, microcrystalline wax, polyethylene wax, polypropylene wax, montan wax, carnauba wax, beeswax and anhydrous lanolin is suitable for use in mixture with a polyolefin resin for molding. A wax such as paraffin wax, microcrystalline wax, polystyrene wax, montan wax and carnauba wax is preferable for use in mixture with a polystyrene resin for molding. These may be used either singly or in combination. The proportion of the wax is not critical but recommendably about 100-500 parts by weight, preferably about 200-400 parts by weight, per 100 parts by weight of the thermochromic granular material.

In preparing a dispersion of the coated thermochromic granular material in a wax according to the invention, it is preferable to use, in combination with the wax, a thermoplastic resin compatible with a thermoplastic resin into which the product color masterbatch is to be incorporated (hereinafter referred to as "thermoplastic resin for molding"). In this case, the color masterbatch may be produced by dispersing the coated thermochromic granular material in a molten mixture of the wax and such thermoplastic resin and pelletizing the mixture obtained. Color master-batches produced in this way will have improved compatibility with the thermoplastic resins for molding.

The thermoplastic resin to be used in combination with the wax is compatible with the thermoplastic resin for molding. When a polystyrene resin is used as the thermoplastic resin for molding, preferred thermoplastic resins to be combined with the wax include polystyrene resins such as polystyrene, acrylonitril-styrene copolymer (AS resin), acrylonitril-butadiene-styrene copolymer (ABS resin), butadiene-styrene copolymer and the like. When a polyolefin resin is used as the thermoplastic resin for molding, preferred thermoplastic resins to be combined with the wax include polyolefin resins such as polyethylene, polypropylene, polybutene, polymethylpentene and the like. More preferred among others are those thermoplastic resins which have a melt flow rate of 10 g/10 minutes or higher, more particularly 10–100 g/10 minutes.

The amount of addition of the thermoplastic resin is not critical but, generally, the thermoplastic resin used in combination with the wax can be used in an amount not exceeding 800 parts by weight, preferably about 100–500 parts by weight, more preferably about 200–400 parts by weight, per 100 parts by weight of the coated thermochromic granular material.

The color masterbatch as well the thermochromic granular material may contain conventional additives, such as ultraviolet absorber, antioxidant, dye, pigment, optical brightener, metal soap, surfactant, water repellent and the like.

Thermoplastic resin shaped products having high commercial value from the color effect viewpoint can be obtained by mixing the thus-obtained color masterbatch according to the invention ith a thermoplastic resin, followed by molding.

Said thermoplastic resins for molding may be any known one. Thus, as such resin, there may be mentioned, for example, polystyrene resins, polyolefin resins, polyvinyl chloride resins, polymethyl methacrylate resins, polyphenylene oxide resins, polyamide resins, polycarbonate resins, polyacetal resins, vinylidene chloride resins, polyethylene terephthalate resins, and the like. Among them, polystyrene resins and polyolefin resins are preferred. The polystyrene resins include homopolymer of styrene and copolymers of styrene and one or more monomers copolymerizable therewith. As the monomers copolymerizable with styrene, there may be mentioned, for example, vinyl compounds such as butadiene, etc., acrylates such as methyl acrylate, etc., methacrylates such as methyl methacrylate, etc., nitriles such as acrylonitrile, etc., ethylene-propylene terpolymers, chlorinated polyethylene, etc. Specific examples of the polystyrene resins are polystyrene, acrylonitrile-butadiene-styrene copolymer (ABS resin), acrylonitrile-styrene copolymer (AS resin), butadiene-styrene-methyl methacrylate copolymer, butadiene-styrene copolymer, foamed polystyrene and the like. The polyolefin resins may include any known ones, such as homopolymers of olefins, intercopolymers of olefins, and copolymers of olefins and one or more monomers copolymerizable therewith. As the monomers copolymerizable with olefins, there may be mentioned, for example, vinyl compounds such as vinyl chloride, vinyl acetate, etc., and ethylenic compounds such as tetrafluoroethylene, etc. Specific examples of the polyolefin resins are polycethylene, polypropylene, polybutene, polymethylpentene, ethylene-vinyl chloride copolymer, ethylenevinyl acetate copolymer, tetrafluoroethylene-ethylene copolymer and the like.

The amount of addition of the color masterbatch according to the invention is not critical but, generally, it is used in an amount of about 1–50 parts by weight, preferably about 5–30 parts by weight, per 100 parts by weight of the thermoplastic resin for molding.

The following preparation example and examples are further illustrative of the present invention. In the examples, "part(s)" are "part(s) by weight".

PREPARATION EXAMPLE (Preparation of thermochromic granular materials)

A mixture of 2 parts of "DEMOL N" (surfactant manufactured by Kao Corp.) and 200 parts of water was heated to 90° C. Then, thereto was added 3 parts of "NCR" (electron-donating chromogen, leuco dye (pink) manufactured by Hodogaya Chemical Co., Ltd.), 3 parts of bisphenol A (electron acceptor), 3 parts of 5,5'-methylenebisbenzotriazole (electron acceptor), 30 parts of myristyl alcohol, 20 parts of lauryl alcohol and 4 parts of "TINUVIN P" (ultraviolet absorber, product of Ciba-Geigy A.-G.). The resultant hot melt was stirred while the rate of stirring was adjusted so that the dispersoid phase in the resulting emulsion could have an average grain size of about 5 μm. After attainment of a stable emulsion state, 20 parts of a 50% methylolmelamine (thermosetting resin) solution in water was added to the emulsion, followed by addition of 2 parts of an acid catalyst (10% ammonium chloride). The resultant mixture was stirred at 90° C. for 1 hour, whereby the dispersoid phase was converted from the oil droplet state to a solidified (cured) state. The mixture was taken out and heat-treated at 120° C. for 2 hours in a hot-air drier for achieving complete curing. The granular material thus obtained was dispersed in 200 parts of a 3% polyvinyl alcohol solution in water. To the dispersion was added 120 parts of a 10% carboxymethylcellulose (hydrophilic high-molecular weight substance) solution in water and, then, 13 parts of a 10% calcium chloride solution in water was added slowly with vigorous stirring. After 30 minutes of stirring, the granular material was recovered and dried. Thus was obtained about 65 parts of a coated thermochromic granular material (coated thermochromic granular material I), with each granule exteriorly coated with carboxymethylcellulose. Said coated granular material changed its color at about 17° C.

Coated thermochromic granular materials II–IX were prepared in the same manner as mentioned above using the respective electron-donating chromogens and solvents specifically given below in Table 1.

TABLE 1

| Thermochromic granular material | Electron-donating chromogen | Solvent |
|---|---|---|
| II | CVL | Myristyl alcohol 30 Lauryl laurate 20 |
| III | PSD-O | Cetyl alcohol 50 |
| IV | NCR | Stearyl alcohol 50 |
| V | B-63 | Octyl alcohol 30 Benzylidene-laurylamine 10 |
| VI | CVL | Cetyl alcohol 50 |
| VII | Y-1 | Myristyl alcohol 30 Lauryl laurate 20 |
| VIII | NCR | Cetyl alcohol 50 |
| IX | CVL | Cetyl alcohol 25 Myristyl alcohol 25 |

Note:
CVL: Crystal violet lactone (for blue violet color development).
PSD-O: Leuco dye manufactured by Shin-Nisso Kako K.K. (for orange color development).
B-63: Leuco dye manufactured by Hodogaya Chemical Co., Ltd. (for blue color development).
Y-1: Leuco dye manufactured by Yamamoto Chemical Ind. Co., Ltd. (for yellow color development).

EXAMPLE 1

Twenty (20) parts of coated thermochromic granular material I, 40 parts of "HIMER ST-95" (polystyrene wax manufactured by Sanyo Chemical Industries, Ltd., softening point 95° C., melting viscosity 1,500 cps), 40 parts of "DIAREX HF-55" (polystyrene resin manufactured by Mitsubishi Monsanto Chemical Company) and 0.2 part of "BLUE NP-038" (dry color manufactured by Dainichiseika Color & Chemicals Mfg. Co., Ltd.) were mixed up in a V-type tumbling mixer, and the resultant mixture was pelletized using a pelletizer in the underwater cutting mode to give a thermochromic color masterbatch.

Twenty (20) parts of the thus-obtained masterbatch was mixed with 80 parts of "ESBRITE 500A" (polystyrene resin manufactured by Sumitomo Chemical Co., Ltd.) in a tumbling mixer, and the mixture obtained was injection-molded into cups using an extruder under the following conditions: molding temperature 210° C., mold temperature 50° C., and injection pressure 800 kg/cm$^2$.

The cups obtained were blue at room temperature (about 25° C.). When cold water (10° C.) was poured into them, they turned violet. This color change was reversible and could be repeated over and over again.

COMPARATIVE EXAMPLE 1

A thermochromic color masterbatch was prepared by treating 20 parts of coated thermochromic granular material I, 80 parts of "ESBRITE 500A" and 0.2 part of "BLUE NP-038" in the same manner as in Example 1.

Cups were produced by using 20 parts of the color masterbatch obtained and 80 parts of "ESBRITE 500A" in the same manner as in Example 1.

The cups of Example 1 and those of Comparative Example 1 were evaluated for color intensity upon color development (the color intensity of the cups of Example 1 was taken as 100), occurrence or nonoccurrence of the phenomenon of blooming during a three-month period, and residual color after disappearance of color. The results obtained are shown below in Table 2.

TABLE 2

|  | Example 1 | Comparative Example 1 |
|---|---|---|
| Color intensity upon color development | 100 | 30 |
| Blooming | No blooming | Fairly remarkable |
| Residual color after disappearance of color | No residual color | Fairly remarkable |

EXAMPLE 2

Fifteen (15) parts of coated thermochromic granular material II, 45 parts of wax (a mixture of 30 parts of carnauba wax and 15 parts of HIMER ST-120 (polystyrene wax manufactured by Sanyo Chemical Industries, Ltd.), softening point 90° C., melting viscosity 600 cps), 40 parts of CEVIAN N-050 (AS resin manufactured by Daicel Chemical Industries, Ltd., melt flow rate 10 g/10 min) and 0.2 part of "TINUVIN 328" (ultraviolet absorber, product of Ciba-Geigy A.G.) were blended and pelletized in the same manner as in Example 1 to give a thermochromic color masterbatch.

Fifteen (15) parts of the thus-obtained color masterbatch and 85 parts of "CEVIAN N-020" (AS resin manufactured by Daicel Chemical Industries, Ltd.) were mixed together in a tubling mixer and then blow-molded into hollow vessels under the following conditions: molding temperature 220° C., mold temperature 60° C., and injection pressure 1,000 kg/cm$^2$.

The hollow vessels obtained were colorless at room temperature (about 25° C.). When cool water (10° C.) was poured into them, they assumed a beautiful blue color. This color change was reversible and could be repeated over and over again.

EXAMPLE 3

Twenty-five (25) parts of coated thermochromic granular material III, 75 parts of HIMER SBM100 (polystyrene wax manufactured by Sanyo Chemical Industries, Ltd., softening point 104° C., melting viscosity 20,000 cps) and 0.2 part of "TINUVIN 328" were mixed together in a V-type tumbling mixer and the mixture was melted in a double-wall stainless vessel equipped with a stirring blade at 150° C. The melt was cooled in a table-type flaker to give a flaky thermochromic color masterbatch.

Twenty (20) parts of the thus-obtained masterbatch and 80 parts of "TUFREX TFX-450" (ABS resin manufactured by Mitsubishi Monsanto Chemical Co.) were mixed together in a tumbling mixer and the mixture was injection-molded into toy mini-cars under the following conditions: molding temperature 230° C., mold temperature 70° C., and injection pressure 1,200 kg/cm$^2$.

The mini-cars obtained were vermilion at room temperature. When they were immersed in warm water (40° C.), they turned colorless. This color change was reversible and could be repeated over and over again.

EXAMPLE 4

Fifteen (15) parts of coated thermochromic granular material IV, 40 parts of wax (a mixture of 20 parts of montan wax and 20 parts of "HIMER ST-95", softening point 90° C., melting viscosity 900 cps) and 45 parts of "DIAREX HF-55" (polystyrene resin manufactured by Mitsubishi Monsanto Chemical Co., melt flow rate 16 g/10 min) were pelletized in the same manner as in Example 1 to give a thermochromic color masterbatch.

Twenty (20) parts of the thus-obtained color masterbatch, 80 parts of "STYRON 666" (polystyrene resin manufactured by Asahi Chemical Industry Co., Ltd.), 8 parts of "CELLMIC CAP" (azodicarbonamide blowing agent manufactured by Sankyo Kasei Co., Ltd.), 1.5 parts of "KAYAREN F" (peroxide crosslinking agent manufactured by Nippon Kayaku Co., Ltd.) and 0.5 part of calcium stearate were kneaded together on a mixing roll at 80°–90° C. The sheet-like material thus obtained was placed in a mold and heated on a hydraulic press at a temperature of 170° C. and a platen pressure of 200 kg/cm$^2$ for 30 minutes and then depressurized to give a crosslinked polystyrene foam.

The foam obtained showed a pink color at room temperature. When immersed in warm water (60° C.), it became colorless. This change was reversible and could be repeated over and over again.

EXAMPLE 5

A thermochromic color masterbatch was prepared by pelletizing, in the same manner as in Example 1, 15 parts of coated thermochromic granular material V, 30 parts of wax (a mixture coated of 25 parts of microcrystalline wax and 5 parts of "HIMER SB-130" (polystyrene wax manufactured by Sanyo Chemical Industries, Ltd.), softening point 95° C., melting viscosity 2,000 cps) and 55 parts of "SANREX SAN-C" (AS resin manufactured by Mitsubishi Monsanto Chemical Co., melt flow rate 25 g/10 min).

Thirty (30) parts of the masterbatch obtained and 70 parts of "SANREX SAN-A" (AS resin manufactured by Mitsubishi Monsanto Chemical Co.) were mixed together in a tumbling mixer, and the mixture was injection-molded into containers for frozen food under the following conditions: molding temperature 220° C., mold temperature 60° C., and injection pressure 1,000 kg/cm².

The containers obtained showed a blue color at a temperature of below −3° C. and was colorless at 5° C. This color change was reversible and could be repeated over and over again.

EXAMPLE 6

A flaky thermochromic color masterbatch was produced by processing, in the same manner as in Example 3, 20 parts of coated thermochromic granular material VI and 80 parts of "HIMER ST-95".

Thirty (30) parts of the masterbatch obtained, 70 parts of "ESBRITE 500 AD-N" (polystyrene resin manufactured by Sumitomo Chemical Co., Ltd.) and 0.1 part of "YELLOW NP-020" (dry color manufactured by Dainichiseika Color & Chemicals Mfg. Co., Ltd.) were mixed up in a V-type tumbling mixer, and the mixture was extruded to give a 2.5-mm-thick sheet. This sheet was molded on a vacuum forming machine by the drape technique to give cups.

The cups obtained showed a green color at a temperature of below 22° C. With the increase in temperature, they underwent gradual color change and, at a temperature of above 30° C., assumed a beautiful yellow color. This color change was reversible and could be repeated over and over again.

EXAMPLE 7

Twenty (20) parts of the thermochromic color masterbatch of Example 3, 80 parts of "TUFREX TFX-465" (ABS resin manufactured by Mitsubishi Monsanto Chemical Co.) and 0.1 part of "YELLOW AB-020" (dry color manufactured by Dainichiseika Color and Chemicals Mfg. Co., Ltd.) were mixed up in a V-type tumbling mixer, and the mixture was extruded to give a 0.7-mm-thick sheet. Said sheet showed an orange color at room temperature and, when immersed in warm water (40° C.), turned yellow. This color change was reversible and could be repeated over and over again.

EXAMPLE 8

A thermochromic color masterbatch was prepared by pelletizing, in the same manner as in Example 1, 20 parts of coated thermochromic granular material II, 50 parts of "SANWAX 131P" (polyethylene wax manufactured by Sanyo Chemical Industries, Ltd., softening point 108° C., melting viscosity 1,000 cps), 30 parts of "SUMIKATHENE G801" (polyethylene resin manufactured by Sumitomo Chemical Co., Ltd., melt flow rate 20 g/10 min) and 0.2 part of "TINUVIN 328".

Ten (10) parts of the thus-obtained color masterbatch, 0.1 part of "PINK PP-049" (dry color manufactured by Dainichiseika Color & Chenicals Mfg. Co., Ltd.) and 90 parts of "SHOLEX M113" (polyethylene resin manufactured by Showa Yuka K.K.) were mixed up in a tumbling mixer and the mixture was molded on a blow molding machine to give water cooling bottles.

These bottles were filled with drinking water and allowed to stand in a refrigerator. When the temperature of the contents was below 13° C., they showed a blue color, while they were pink-colored at temperature of up to 13° C. The color change was reversible and could be repeated over and over again.

EXAMPLE 9

A thermochromic color masterbatch was prepared by pelletizing, in the same manner as in Example 1, 30 parts of coated thermochromic granular material VII, 50 parts of "VISCOL TS200" (polypropylene wax manufactured by Sanyo Chemical Industries, Ltd., softening point 145° C., melting viscosity 120 cps), 20 parts of "NOBLEN AX961" (polypropylene resin manufactured by Sumitomo Chemical Co., Ltd., melt flow rate 50 g/10 min) and 0.4 part of "BLUE PP-038".

Ten (10) parts of the masterbatch obtained was mixed with 90 parts of "NOBLEN Y101" (polypropylene resin manufactured by Sumitomo Chemical Co., Ltd.) in a tumbling mixer, and the mixture was injection-molded into cups.

The cups had a blue color at room temperature (25° C.). When cool water (10° C.) was poured into them, they assumed a green color. This color change was reversible and could be repeated over and over again.

EXAMPLE 10

A thermochromic color masterbatch was prepared by pelletizing, in the same manner as in Example 1, 25 parts of coated thermochromic granular material VIII, 45 parts of wax (a mixture of 20 parts of carnauba wax and 25 parts of "SUNWAX 131P", softening point 100° C., melting viscosity 800 cps) and 35 parts of "SHOLEX M251" (polyethylene resin manufactured by Showa Yuka K.K.).

A crosslinked EVA (ethylene-vinyl acetate copolymer) foam was produced using 30 parts of the masterbatch obtained, 70 parts of "EVATATE H4011" (ethylenevinyl acetate copolymer manufactured by Sumitomo Chemical Co., Ltd.), 7 parts of "CELLMIC CAP", 1.5 parts of "KAYAREN F" and 0.5 part of stearic acid and following the procedure of Example 4.

This foam showed a pink color at room temperature but, when immersed in warm water (40° C.), it turned colorless. This color change was reversible and could be repeated over and over again.

EXAMPLE 11

A flaky thermochromic color masterbatch was produced by treating, in the same manner as in Example 3, 30 parts of coated thermochromic granular material IX, 50 parts of "VISCOL 330-P" (polypropylene wax manufactured by Sanyo Chemical Industries, Ltd., softening point 150° C., melting viscosity 3,000 cps) and 40 parts of "NOBLEN AZ961" (polypropylene resin manufactured by Sumitomo Chemical Co., Ltd., melt flow rate 40 g/10 min).

Ten (10) parts of the masterbatch obtained, 90 parts of "NOVATEC ET-008" (polypropylene resin manufactured by Mitsubishi Kasei Corp.), 0.5 part of "SUMILIZER BHT" (antioxidant manufactured by Sumitomo Chemical Co., Ltd.), 0.2 part of dibutyltin dibutylmercaptide and 0.3 part of "YELLOW PP-020" were mixed up in a tumbling mixer, and the mixture was homogenized by heating at 230° C. for 10 minutes in an extruder and then spun by extrusion, at 200° C., into water through a 360-hole spinneret. The filaments spun out were drawn to a draw ratio of 5 on a draw roller in water maintained at 70° C. and further heat-treated at 150° C. for 5 minutes to give thermochromic polypropylene filaments with a fineness of 50 denier.

These filaments were curled, cut to adequate lengths and sewn into the scalp portion of a slush-molded doll in the manner of hair. The hair showed a pink color at room temperature (25° C.) but, when touched by the hand or immersed in warm water (30° C. or above), turned yellow immediately. This color change was reversible and could be repeated over and over again.

EXAMPLE 12

A thermochromic color masterbatch was prepared by pelletizing, in the same manner as in Example 1, 20 parts of coated thermochromic granular material III, 40 parts of wax (a mixture of 25 parts of montan wax and 15 parts of "Biscose 330P" (polypropylene wax manufactured by Sanyo Chemical Industries, Ltd.), softening point 120° C., melting viscosity 200 cps), 40 parts of "NOBLEN AZ961" (polypropylene resin manufactured by Sumitomo Chemical Co., Ltd., melt flow rate 40 g/10 min) and 0.2 part of "YELLOW PP-020" (dry color manufactured by Dainichiseika Color & Chemicals Mfg. Co., Ltd.).

Five (5) parts of the masterbatch obtained and 95 parts of "NOBLEN AW564" (polypropylene resin manufactured by Sumitomo Chemical Co., Ltd.) were mixed up in a tumbling mixer, and the mixture was injection-molded to give bath pails.

The bath pails had a vermilion color at room temperature but, upon immersion in warm water (40° C.), assumed a yellow color. This change was reversible and could be repeated over and over again.

EXAMPLE 13

Ten (10) parts of the thermochromic color masterbatch of Example 11 and 90 parts of "NOBLEN Y101" were mixed up in a tumbling mixer, and the mixture was injection-molded to give toothbrush stocks, which were then bristled at the head portion thereof.

The toothbrushes thus produced showed a blue color at room temperature (25° C.). After about 3 minutes of brushing teeth with the same held in the hand, the handle portion turned colorless by the effect of the body temperature. This color change was reversible and could be repeated over and over again.

EXAMPLE 14

Thirty (30) parts of coated thermochromic granular material I, 70 parts of "SANWAX 131P", 2 parts of white pigment and 0.5 part of "TINUVIN 328" were mixed up in a V-type tumbling mixer, and the mixture was melted in a double-wall stainless steel vessel equipped with a stirring blade. The melt was discharged onto an endless steel belt cooled with a cooling device to give a thermochromic color masterbatch.

Ten (10) parts of the masterbatch obtained and 90 parts of "STAFLENE E704" (polyethylene manufactured by Nippon Petrochemicals Co., Ltd.) were mixed up in a tumbling mixer, and the mixture was extrusion-molded to give a tube having a diameter of 5 mm, which was cut into 20-cm-long pieces.

The thus-obtained thermochromic straws were colorless at room temperature (25° C.) but, when immersed in cool water (15° C. or below), assumed a pink color. This color change was reversible and could be repeated over and over again.

What is claimed is:

1. A thermochromic color masterbatch for use in a thermoplastic resin comprising a wax having substantially homogeneously dispersed therein a thermochromic granular material, said thermochromic granular material being a mixture of a thermochromic composition comprising 2 to 20% by weight of an electron donating chromogen, 4 to 40% by weight of an electron acceptor, and an alcohol, ester, azomethine or amide solvent having a boiling point 150° C. or higher, with 10 to 40 parts by weight of a thermosetting resin per 100 parts by weight of said thermochromic composition, said thermochromic graular material being coated with about 5–30 parts by weight per 100 parts by weight of said thermochromic composition with a hydrophilic high-molecular weight substance coagulable by means of an acid, an alkaline electrolyte, a heavy metal, an aldehyde or a zwitterion; said masterbatch containing 100–500 parts by weight of said wax per 100 parts by weight of said thermochromic granular material.

2. The color masterbatch according to claim 1 wherein the wax has a melting point of 50°–180° C., and a melt viscosity of 100–50,000 cps.

3. The color masterbatch according to claim 2, wherein the wax has a melting point of 70°–150° C., and a melt viscosity of 500–20,000 cps.

4. The color masterbatch according to claim 1 wherein the wax is at least one species selected from the group consisting of paraffin wax, microcrystalline wax, montan wax, carnauba wax, polystyrene wax, polyethylene wax, polypropylene wax, beeswax and anhydrous lanolin.

5. The color masterbatch according to claim 1, which contains 200–400 parts by weight of the wax per 100 parts of the coated thermochromic granular material.

6. The color masterbatch according to claim 1, in which said coated thermochromic granular material is substantially homogeneously dispersed in a mixture of the wax and up to 800 parts by weight per 100 parts by weight of the coated thermochromic granular material of a thermoplastic resin.

7. The color masterbatch according to claim 6, wherein the thermoplastic resin has a melt flow rate of at least 10 g/10 minutes.

8. The color masterbatch according to claim 7, wherein the thermoplastic resin is a polystyrene resin or polyolefin resin.

9. The color masterbatch according to claim 8 wherein the polystyrene resin is at least one polymer selected from the group consisting of polystyrene and copolymers of styrene and at least one monomer copolymerizable therewith.

10. The color masterbatch according to claim 7 wherein the polyolefin resin is at least one polymer selected from the group consisting of homopolymers of olefins and copolymers of olefins and at least one monomer copolymerizable therewith.

11. The color masterbatch according to claim 6 wherein a wax combined with a polystyrene resin is at least one species selected from the group consisting of paraffin wax, microcrystalline wax, polystyrene wax, montan wax and carnauba wax.

12. The color masterbatch according to claim 6 wherein a wax combined with a polyolefin resin is at least one species selected from the group consisting of paraffin wax, microcrystalline wax, polyethylene wax, polypropylene wax, montan wax, carnauba wax, beewax and anhydrous lanolin.

13. A shaped thermoplastic resin produced by admixing a thermoplastic resin with a color masterbatch of claim 1 and shaping the mixture into a desired shape.

* * * * *